United States Patent
Terry et al.

(10) Patent No.: US 10,271,318 B2
(45) Date of Patent: *Apr. 23, 2019

(54) METHOD AND APPARATUS FOR PROVIDING AND UTILIZING A NON-CONTENTION BASED CHANNEL IN A WIRELESS COMMUNICATION SYSTEM

(71) Applicant: INTERDIGITAL TECHNOLOGY CORPORATION, Wilmington, DE (US)

(72) Inventors: Stephen E. Terry, Northport, NY (US); Jin Wang, Princeton, NJ (US); Arty Chandra, Roslyn, NY (US); John S. Chen, Ann Arbor Township, MI (US); Guodong Zhang, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,769

(22) Filed: Aug. 14, 2017

(65) Prior Publication Data

US 2017/0367089 A1 Dec. 21, 2017

Related U.S. Application Data

(63) Continuation of application No. 14/828,261, filed on Aug. 17, 2015, now Pat. No. 9,781,708, which is a (Continued)

(51) Int. Cl.
*H04W 72/04* (2009.01)
*H04B 7/26* (2006.01)
(Continued)

(52) U.S. Cl.
CPC ...... *H04W 72/0413* (2013.01); *H04B 7/2621* (2013.01); *H04L 1/1812* (2013.01);
(Continued)

(58) Field of Classification Search
CPC ............ H04B 7/18528; H04B 7/18571; H04B 7/18576; H04B 7/2121; H04B 7/2123;
(Continued)

(56) References Cited

U.S. PATENT DOCUMENTS 6,487,184 B1  11/2002  Pecen et al.
6,684,079 B1   1/2004  Aretz et al.
(Continued)

FOREIGN PATENT DOCUMENTS

AU   736793 B2   8/2001
CN   1567759 A   1/2005
(Continued)

OTHER PUBLICATIONS

US 8,208,366 B2, 06/2012, Ahn et al. (withdrawn)
(Continued)

*Primary Examiner* — Dady Chery
(74) *Attorney, Agent, or Firm* — Condo Roccia Koptiw LLP

(57) ABSTRACT

In a wireless communication system comprising at least one evolved Node-B (eNB) and a plurality of wireless transmit/receive units (WTRUs), a non-contention based (NCB) channel is established, maintained, and utilized. The NCB channel is allocated for use by one or more WTRUs in the system for utilization in a variety of functions, and the allocation is communicated to the WTRUs. The wireless communication system analyzes the allocation of the NCB channel as required, and the NCB channel is reallocated as required.

19 Claims, 10 Drawing Sheets

Related U.S. Application Data continuation of application No. 14/055,350, filed on Oct. 16, 2013, now Pat. No. 9,203,580, which is a continuation of application No. 11/669,269, filed on Jan. 31, 2007, now Pat. No. 8,619,747.

(60) Provisional application No. 60/886,164, filed on Jan. 23, 2007, provisional application No. 60/763,791, filed on Jan. 31, 2006.

(51) Int. Cl.
| | | |
|---|---|---|
| H04L 1/18 | (2006.01) | |
| H04W 56/00 | (2009.01) | |
| H04W 72/12 | (2009.01) | |
| H04W 74/04 | (2009.01) | |
| H04L 5/00 | (2006.01) | |

(52) U.S. Cl.
CPC ....... *H04L 5/0037* (2013.01); *H04W 56/0045* (2013.01); *H04W 72/1278* (2013.01); *H04W 74/04* (2013.01)

(58) Field of Classification Search
CPC .... H04B 7/2045; H04B 7/208; H04B 7/2621; H04W 84/06; H04W 72/04; H04W 72/12; H04W 76/00; H04W 72/00; H04W 72/02; H04W 28/10; H04W 28/12; H04W 28/14; H04W 28/16; H04W 28/18; H04W 28/20; H04W 28/22; H04W 28/24; H04W 28/26; H04J 1/08; H04J 3/16; H04J 3/17; H04J 2203/0069; H04Q 2213/394; H04Q 5/12; H04Q 9/12; H03H 7/46
USPC ........ 370/328, 343, 344, 329, 341, 431, 468
See application file for complete search history.

(56) References Cited

U.S. PATENT DOCUMENTS

| | | | |
|---|---|---|---|
| 6,693,892 B1 | 2/2004 | Rinne et al. | |
| 6,738,634 B1* | 5/2004 | Shin | H04W 4/06 370/535 |
| 6,807,160 B1 | 10/2004 | Laroia et al. | |
| 6,980,540 B1 | 12/2005 | Laroia et al. | |
| 7,333,457 B2* | 2/2008 | Gopalakrishnan | H04J 13/20 370/328 |
| 7,363,057 B2 | 4/2008 | Ishii et al. | |
| 7,492,828 B2 | 2/2009 | Keerthi | |
| 7,505,448 B2* | 3/2009 | Sheng | H04W 72/10 370/348 |
| 7,551,625 B2* | 6/2009 | Ahn | H04W 72/14 370/395.4 |
| 2002/0141367 A1 | 10/2002 | Hwang et al. | |
| 2003/0039270 A1 | 2/2003 | Chang et al. | |
| 2003/0096631 A1 | 5/2003 | Kayama et al. | |
| 2004/0085936 A1 | 5/2004 | Gopalakrishnan et al. | |
| 2004/0191965 A1* | 9/2004 | Kim | H01L 29/458 438/149 |
| 2004/0213199 A1* | 10/2004 | Cheng | H04W 56/005 370/350 |
| 2004/0219917 A1* | 11/2004 | Love | H04L 1/1671 455/436 |
| 2004/0224692 A1 | 11/2004 | Hamabe | |
| 2005/0164641 A1 | 7/2005 | Niwano | |
| 2005/0181832 A1 | 8/2005 | Ishii et al. | |
| 2005/0191965 A1 | 9/2005 | Yu et al. | |
| 2005/0219148 A1* | 10/2005 | Bayley | G03B 21/006 345/1.3 |
| 2005/0238053 A1 | 10/2005 | Iochi et al. | |
| 2005/0249148 A1 | 11/2005 | Nakamata et al. | |
| 2005/0276252 A1 | 12/2005 | Sizeland et al. | |
| 2005/0282568 A1 | 12/2005 | Keerthi | |
| 2006/0007889 A1 | 1/2006 | Khan | |
| 2006/0159061 A1 | 7/2006 | Takano et al. | |
| 2006/0256757 A1 | 11/2006 | Kuusela et al. | |
| 2007/0115915 A1 | 5/2007 | Sheng et al. | |
| 2007/0149227 A1 | 6/2007 | Parizhsky et al. | |
| 2007/0171849 A1 | 7/2007 | Zhang et al. | |
| 2007/0171871 A1 | 7/2007 | Forsberg | |
| 2011/0158123 A1 | 6/2011 | Kim et al. | |
| 2011/0190018 A1 | 8/2011 | Love et al. | |
| 2013/0301579 A1 | 11/2013 | Zhang et al. | |
| 2014/0044078 A1 | 2/2014 | Terry et al. | |

FOREIGN PATENT DOCUMENTS

| | | | |
|---|---|---|---|
| CN | | 1681348 A | 10/2005 |
| CN | | 2746688 Y | 12/2005 |
| EP | | 1168876 A1 | 1/2002 |
| EP | | 1315342 A1 | 5/2003 |
| EP | | 1496628 A1 | 1/2005 |
| EP | | 1517457 A1 | 3/2005 |
| EP | | 1605647 A1 | 12/2005 |
| EP | | 1613117 A2 | 1/2006 |
| EP | | 1643690 A1 | 4/2006 |
| FR | | 2765763 A1 | 1/1999 |
| JP | | 11-234738 A | 8/1999 |
| JP | | 2001-145155 A | 5/2001 |
| JP | | 2001-244913 A | 9/2001 |
| JP | | 2002-058065 A | 2/2002 |
| JP | | 2002-526970 A | 8/2002 |
| JP | | 2002-369258 A | 12/2002 |
| JP | | 2003-163962 A | 6/2003 |
| JP | | 2003-318861 A | 11/2003 |
| JP | | 2004-159300 A | 6/2004 |
| JP | | 2005-244991 A | 9/2005 |
| JP | | 2005-333677 A | 12/2005 |
| JP | | 2006-025438 A | 1/2006 |
| JP | | 2006-505219 A | 2/2006 |
| JP | | 2007-511963 A | 5/2007 |
| JP | | 2007-526692 A | 9/2007 |
| JP | | 2008-502277 A | 1/2008 |
| JP | | 2008-503933 A | 2/2008 |
| JP | | 5075841 B2 | 11/2012 |
| JP | | 5770818 B2 | 8/2015 |
| RU | | 2109327 C1 | 4/1998 |
| WO | WO 2001/011907 A1 | | 2/2001 |
| WO | WO 2001/061878 A1 | | 8/2001 |
| WO | WO 2002/003600 A1 | | 1/2002 |
| WO | WO 2003/024028 A1 | | 3/2003 |
| WO | WO 2003/084099 A1 | | 10/2003 |
| WO | WO 2003/094550 A1 | | 11/2003 |
| WO | WO 2003/096577 A1 | | 11/2003 |
| WO | WO 2004/040935 A1 | | 5/2004 |
| WO | WO 2005/039134 A1 | | 4/2005 |
| WO | WO 2005/053329 A1 | | 6/2005 |
| WO | WO 2005/101879 A1 | | 10/2005 |
| WO | WO 2006/009713 A1 | | 1/2006 |
| WO | WO 2006/020520 A2 | | 2/2006 |

OTHER PUBLICATIONS

3rd Generation Partnership Project (3GPP), R1-050249, "Downlink Multiple Access Scheme for Evolved UTRA", NTT DoCoMo, Inc., Power Point Presentation, 3GPP TSG RAN WG Meeting #40bis, Beijing, China, Apr. 4-8, 2005, pp. 1-45.

3rd Generation Partnership Project (3GPP), R1-050249, "Downlink Multiple Access Scheme for Evolved UTRA", NTT DoCoMo, Inc., 3GPP TSG RAN WG1 Meeting #40bis, Beijing, China, Apr. 4-8, 2005, pp. 1-83.

3rd Generation Partnership Project (3GPP), R1-050845, "EUTRA Downlink Multiplexing of Localized and Distributed Channels", Huawei, 3GPP TSG RAN WG1, London, UK, Aug. 29-Sep. 2, 2005, 9 pages.

3rd Generation Partnership Project (3GPP), R1-051143, "Multiplexing Method of Shared Control Channel in Uplink Single-Carrier FDMA Radio Access", NTT DoCoMo, Fujitsu, Mitsubishi Electric Corporation, NEC, Panasonic, Sharp, Toshiba Corporation, TSG-RAN WG1 #42bis, San Diego, USA, Oct. 10-14, 2005, pp. 1-8.

(56) References Cited

OTHER PUBLICATIONS

3rd Generation Partnership Project (3GPP), R1-051430, "Further Considerations on Multiplexing Method of Shared Control Channel in Uplink Single-Carrier FDMA", Huawei, 3GPP TSG-RAN WG1 #43, Seoul, Korea, Nov. 7-11, 2005, pp. 1-6.
3rd Generation Partnership Project (3GPP), R1-051570, "Revised Text Proposal on Multiplexing Method of L 1/L2 Control Signaling in Uplink Single-Carrier FDMA Radio Access", Ericsson, 3GPP TSG-RAN WG1 #43, Seoul, Korea, Nov. 7-11, 2005, pp. 1-3.
3rd Generation Partnership Project (3GPP), R1-060155, "Scheduling and Multiplexing of CQI and ACK/NACK Feedback for Single Carrier FDMA in Evolved UTRA Uplink", TSGRAN WG1 LTE Ad Hoc Meeting, Helsinki, Finland, Jan. 23-25, 2006, pp. 1-8.
3rd Generation Partnership Project (3GPP), R1-060364, "Scheduling and Multiplexing of CQI and ACK/NACK Feedback for Single Carrier FDMA in Evolved UTRA Uplink", InterDigital, 3GPP TSG RAN WG1 Meeting #44, Denver, USA, Feb. 13-17, 2006, 8 pages.
3rd Generation Partnership Project (3GPP), R1-060852, "Scheduling and Multiplexing of CQI and ACK/NACK Feedback for Single Carrier FDMA in Evolved UTRA Uplink", InterDigital, 3GPP TSG RAN WG1 Meeting #44bis, Athens, Greece, Mar. 27-31, 2006, 8 pages.
3rd Generation Partnership Project (3GPP), R1-070041, "Dynamic Contention Free Scheduling Request", Motorola, TSG RAN#47-bis, Sorrento, Italy, Jan. 15-19, 2006, 3 pages.
3rd Generation Partnership Project (3GPP), R2-060059, "Uplink Transport Channels in LTE", 3GPP TSG RAN WG2#50, Ericsson, Sophia-Antipolis, France, Jan. 9-13, 2006, 3 pages.
3rd Generation Partnership Project (3GPP), R2-060109, "LTE MAC Scheduling and Signaling Parameters", LG Electronics, 3GPP TSG RAN WG2 Meeting #50, Sophia Antipolis, France, Jan. 9-13, 2006, 3 pages.
3rd Generation Partnership Project (3GPP), R2-063183, "Periodic Scheduling of Uplink Resources for LTE VoIP", InterDigital Communications Corporation, 3GPP TSG RAN WG2 #56, Riga, Latvia, Nov. 6-10, 2006, 6 pages.
3rd Generation Partnership Project (3GPP), R2-070020, "Scheduling of LTE UL VoIP", 3GPP TSG-RAN WG2 Meeting #56bis, Nokia, Sorrento, Italy, Jan. 15-19, 2007, 4 pages.
3rd Generation Partnership Project (3GPP), Tdoc R1-030964, "Text Proposal on Enhanced CQI Reporting", Philips, Mitsubishi Electric, Siemens, 3GPP TSG-RAN WG1 Meeting #34, Seoul, Korea, Oct. 6-10, 2003, 16 pages.
3rd Generation Partnership Project (3GPP), Tdoc R1-051347, "Uplink Scheduling Procedure", Samsung, 3GPP TSG-RAN WG1 Meeting# 43, Seoul, Korea, Nov. 7-11, 2005, 5 pages.
3rd Generation Partnership Project (3GPP), Tdoc R1-060241, "Initial Access Procedure and Uplink Synchronisation", IP Wireless, 3GPP TSG RAN WG1 LTE Ad Hoc, Helsinki, Finland, Jan. 23-25, 2006, 10 pages.
3rd Generation Partnership Project (3GPP), Tdoc R1-060637, "Initial Access Procedure and Uplink Synchronisation", IPWireless, TSG RAN WG1 #44, Denver, Colorado, USA, Feb. 13-17, 2006, 10 pages.
3rd Generation Partnership Project (3GPP), Tdoc R2-051272, "Uplink Signalling Architecture for 3.84Mcps TDD Enhanced Uplink", 3GPP TSG RAN WG2#47, IPWireless, Athens, Greece, May 9-13, 2005, 4 pages.
3rd Generation Partnership Project (3GPP), Tdoc R2-060034, "RRC Connection Establishment Procedure for E-UTRA", IP Wireless, 3GPP TSG RAN WG2 #50, Sophia Antipolis, France, Jan. 9-13, 2006, 8 pages.
3rd Generation Partnership Project (3GPP), Tdoc R2-060132, "RRC Connection Establishment Procedure for E-UTRA", 3GPP TSG RAN WG2 #50, IPWireless, Sophia Antipolis, France, Jan. 9-13, 2006, 8 pages.
3rd Generation Partnership Project (3GPP), Tdoc R2-070056, "Scheduling Request in E-UTRAN", Ericsson, 3GPP TSG-RAN WG2 #56bis, Sorrento, Italy, Jan. 15-19, 2007, 11 pages.
3rd Generation Partnership Project (3GPP), Tr 25.814, V1.0.1, "Technical Specification Group Radio Access Network, Physical Layer Aspects for Evolved UTRA, (Release 7)", Nov. 2005, pp. 1-72.
3rd Generation Partnership Project (3GPP), TR 25.840 V4.0.0, "Technical Specification Group Radio Access Network, Terminal Power Saving Features (Release 4)", Dec. 2003, pp. 1-30.
3rd Generation Partnership Project (3GPP), TR 25.903 V0.2.0, "3rd Generation Partnership Project, Technical Specification Group Radio Access Network, Continuous Connectivity for Packet Data Users (Release 7)", Nov. 2005, pp. 1-36.
3rd Generation Partnership Project (3GPP), TS 25.211 V4.6.0, "Technical Specification Group Radio Access Network, Physical Channels and Mapping of Transport Channels onto Physical Channels (FDD) (Release 4)", Sep. 2002, pp. 1-46.
3rd Generation Partnership Project (3GPP), TS 25.211 V5.8.0, "Technical Specification Group Radio Access Network, Physical Channels and Mapping of Transport Channels onto Physical Channels (FDD) (Release 5)", Dec. 2005, pp. 1-39.
3rd Generation Partnership Project (3GPP), TS 25.214 V5.9.0, "Technical Specification Group Radio Access Network, Physical Layer Procedures (FDD) (Release 5)", Jun. 2004, pp. 1-64.
European Telecommunication Standard Institute (ETSI), TS 125 224 V7.1.0, "Universal Mobile Telecommunications System (UMTS), Physical Layer Procedures (TDD) (3GPP Ts 25.224 V7.1.0) (Release 7)", Sep. 2006, pp. 1-62.
European Telecommunication Standard Institute (ETSI), TS 125 224 V6.5.0, "Universal Mobile Telecommunications System (UMTS), Physical Layer Procedures (TDD) (3GPP TS 25.224 V6.5.0) (Release 6)", Jun. 2005, pp. 1-50.
European Telecommunication Standard Institute (ETSI), TS 125 224 V6.4.0, "Universal Mobile Telecommunications System (UMTS), Physical Layer Procedures (TDD) (3GPP TS 25.224 V6.4.0) (Release 6)", Mar. 2005, pp. 1-50.
European Telecommunication Standard Institute (ETSI), TS 125 225 V6.1.0, "Universal Mobile Telecommunications System (UMTS), Physical Layer Measurements (TDD), (3GPP TS 25.225 V6.1.0) (Release 6)", Mar. 2004, pp. 1-25.
European Telecommunication Standard Institute (ETSI), TS 125 225 V7.2.0, "Universal Mobile Telecommunications System (UMTS), Physical Layer, Measurements (TDD) (3GPP TS 25.225 V7.2.0) (Release 7)", Sep. 2006, pp. 1-26.
European Telecommunication Standard Institute (ETSI), TS 125 427 V7.3.0, "Universal Mobile Telecommunications System (UMTS), UTRAN Iur/Iub Interface User Plane Protocol for DCH Data Streams (3GPP TS 25.427 V7.3.0) (Release 7)", Dec. 2006, pp. 1-45.
European Telecommunication Standard Institute (ETSI), TS 125 427 V6.5.0, "Universal Mobile Telecommunications System (UMTS), UTRAN Iur/Iub Interface User Plane Protocol for DCH Data Streams (3GPP TS 25.427 V6.5.0) (Release 6)", Dec. 2005, pp. 1-42.
3rd Generation Partnership Project (3GPP), R2-060035, "Non-Scheduled Up-Link Shared Transport Channel for E-UTRA", IP Wireless, 3GPP TSG RAN WG2 #50, Sophia Antipolis, France, Jan. 9-13, 2006, 3 pages.
3rd Generation Partnership Project (3GPP), R2-070214, "Contention and Contention-Free Intra-LTE Handovers", Motorola, 3GPP TSG-RAN WG2 #56bis, Sorrento, Italy, Jan. 15-19, 2007, 4 pages.
3rd Generation Partnership Project (3GPP), R3-051344, "Handling of UEs in LTE_Active (Re-Submission of R2-052917)", Siemens, 3GPP TSG RAN WG3 Meeting #49, Seoul, Korea, Nov. 7-11, 2005, 6 pages.

\* cited by examiner

METHOD AND APPARATUS FOR PROVIDING AND UTILIZING A NON-CONTENTION BASED CHANNEL IN A WIRELESS COMMUNICATION SYSTEM

CROSS REFERENCE TO RELATED APPLICATIONS

This application is a continuation of U.S. patent application Ser. No. 14/828,261, filed Aug. 17, 2015, which is a continuation of U.S. patent application Ser. No. 14/055,350, filed Oct. 16, 2013, which issued as U.S. Pat. No. 9,203,580, which is a continuation of U.S. patent application Ser. No. 11/669,269, filed Jan. 31, 2007, which issued as U.S. Pat. No. 8,619,747, on Dec. 31, 2013, which claims the benefit of U.S. Provisional Application No. 60/886,164, filed Jan. 23, 2007 and U.S. Provisional Application No. 60/763,791, filed Jan. 31, 2006, which are incorporated by reference herein as if fully set forth.

FIELD OF INVENTION

The present invention relates to wireless communication systems. More particularly, the present invention relates to a method and apparatus for providing and utilizing a non-contention based channel in a wireless communication system.

BACKGROUND

The Long Term Evolution (LTE) of wideband code division multiple access (WCDMA) third generation (3G) cellular networks is directed to universal mobile telecommunication systems (UMTS) beyond the third generation partnership project (3GPP) Release 7. LTE may also be referred to as evolved UMTS terrestrial radio access (E-UTRA). One of the main technological challenges of such networks is efficient channel usage when there is a varied traffic mix in the system. This may be particularly challenging when the various types of traffic utilize different transmission protocols, such as voice over internet protocol (VoIP), file transfer protocol (FTP), or hypertext transfer protocol (HTTP). For example, in any particular wireless communication system, there may be numerous VoIP users, FTP users, and HTTP users all transmitting simultaneously.

Additionally, the wireless transmit/receive units (WTRUs) in the system perform a variety of tasks and functions that require access to the transmission medium in order to communicate with a base station. For example, the WTRUs must perform functions such as timing advance, measurement reporting, requesting uplink (UL) physical resource allocation, providing schedule information for downlink (DL) allocation, keep-alive heartbeat, hybrid automatic repeat request (HARQ) feedback and/or Medium Access Control (MAC) or Radio Resource Control (RRC) layer signaling.

The WTRUs in a wireless communication system could utilize a Random Access Channel (RACH) or physical RACH (PRACH) in order to communicate with the base station to perform these functions. However, a RACH is a contention-based channel, and its use incurs delays that tend to affect quality of service (QoS) and may result in inefficient use of physical resources. A reliance on RACH for interactive applications between transmissions may also negatively impact system capacity.

Alternatively, the WTRU could utilize a UL shared channel to perform these functions. However, a UL shared channel resource request would first have to be transmitted on a RACH/PRACH, which would be an inefficient use of resources and would add delay to these functions due to the two step procedure.

In the context of LTE, it would be desirable to utilize an access protocol such as a non-contention based (NCB) channel, which may also be referred to as a "thin" or "dedicated" channel. Thin channels are generally contention-free, or low contention, control channels that are primarily used for access.

It would therefore be advantageous to provide a method and apparatus for providing and utilizing an NCB channel that would not be subject to the limitations of the current state of the art.

SUMMARY

The present invention is directed to the establishment, maintenance, and utilization of a non-contention based (NCB) channel in a wireless communication system comprising at least one Evolved Node-B (eNB) and a plurality of wireless transmit/receive units (WTRUs). Each NCB channel is dedicated and allocated for use by a particular WTRU in the system for utilization in a variety of functions, and the allocation is communicated to the WTRUs in the system by the eNB. The wireless communication system analyzes the allocation of each NCB channel as required, and each NCB channel is reallocated as required.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station (STA), a mesh point (MP), a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In general, the present invention is directed to a method and apparatus for establishing, maintaining, and utilizing non-contention based (NCB) dedicated channels. The NCB channels, in a preferred embodiment of the present invention, are channels that are dedicated to a particular WTRU for use during a particular time and may be re-allocated depending on system need. The NCB channel utilization may aid in avoiding latency and inefficient use of physical resources associated with an UL contention based procedure, and may also be used in downlink or in ad-hoc networks.

Figure 1:
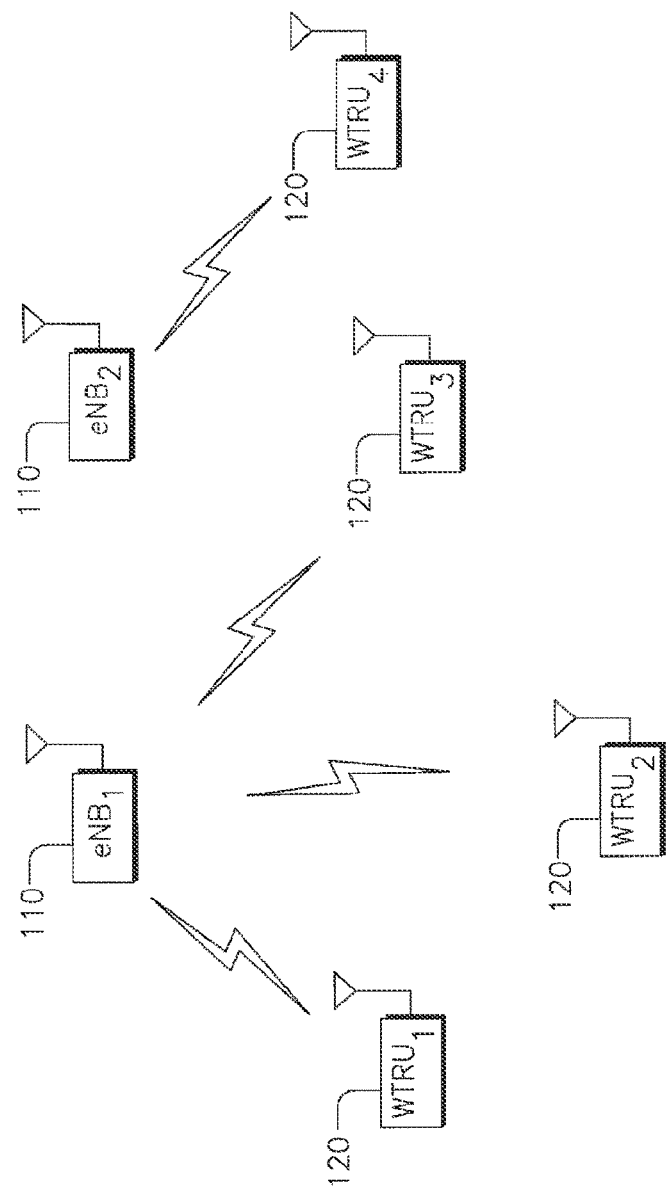
FIG. 1 shows an exemplary wireless communication system configured in accordance with the present invention.

FIG. 1 shows an exemplary wireless communication system 100 (also referred to hereinafter as "system") configured in accordance with the present invention. The wireless communication system 100 includes a plurality of evolved Node-Bs (eNBs) 110 (designated as eNB$_1$ and eNB$_2$) and a plurality of WTRUs 120 (designated WTRU$_1$, WTRU$_2$, WTRU$_3$, and WTRU$_4$), in wireless communication with the eNBs 110. The WTRUs 120 depicted in the wireless communication system 100 may comprise any combination of WTRUs, such as STAs, MPs, and the like. In a preferred embodiment, the eNBs 110 provide access to a network to the WTRUs 120 (WTRU$_1$, WTRU$_2$, WTRU$_3$, and WTRU$_4$) in communication with them. As shown in an exemplary configuration in FIG. 1, WTRU$_1$, WTRU$_2$, and WTRU$_3$ are currently in communication with eNB$_1$ while WTRU$_4$ is in currently in communication with eNB$_2$. However, any of the WTRUs 120 may be in communication with either of the eNBs 110, apart from what is depicted in FIG. 1.

Figure 2:
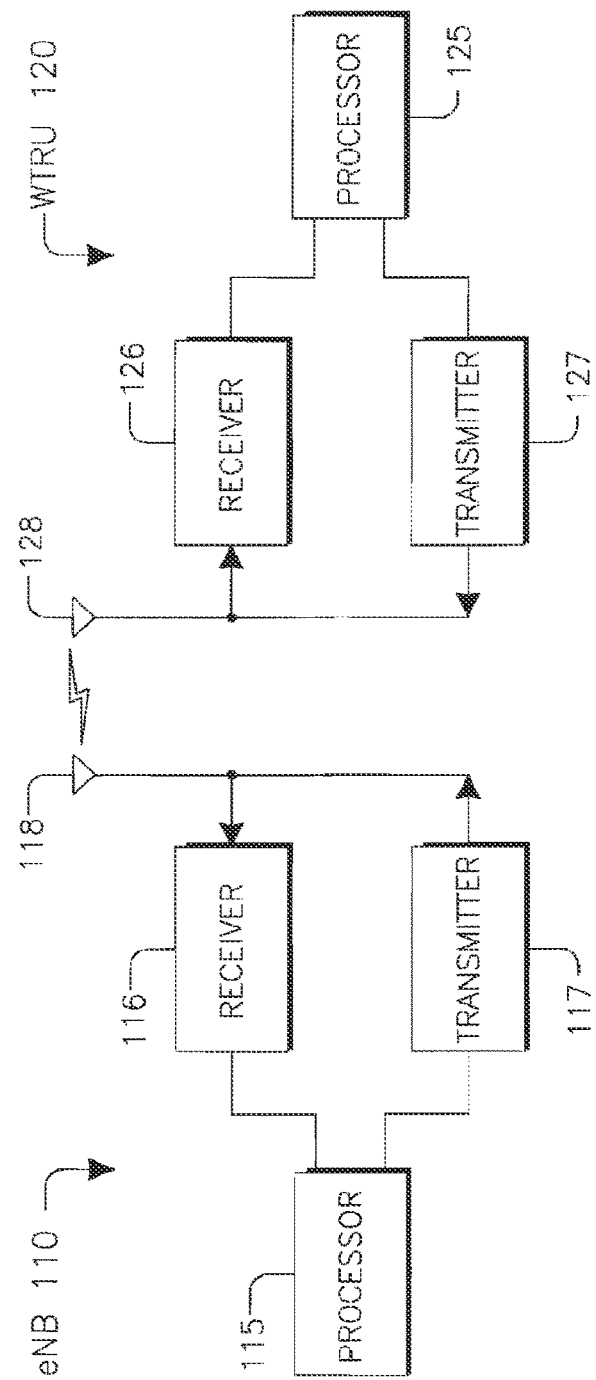
FIG. 2 is a functional block diagram of an eNB and a WTRU of the wireless communication system of FIG. 1.

FIG. 2 is a functional block diagram of the eNB 110 and a WTRU 120 of the wireless communication system 100 of FIG. 1. As shown in FIG. 2, the eNB 110 and WTRU 120 are in wireless communication with one another, and are configured to utilize an NCB channel in the wireless communication system 100. In one example, the WTRU 120 may be a mobile STA or an MP in communication with the eNB 110, which provides access to a network for the WTRU 120.

In addition to the components that may be found in a typical eNB, the eNB 110 includes a processor 115, a receiver 116, a transmitter 117, and an antenna 118. The processor 115 is configured to establish, maintain and utilize an NCB channel in accordance with the present invention. The receiver 116 and the transmitter 117 are in communication with the processor 115. The antenna 118 is in communication with both the receiver 116 and the transmitter 117 to facilitate the transmission and reception of wireless data.

Similarly, in addition to the components that may be found in a typical WTRU, the WTRU 120 includes a processor 125, a receiver 126, a transmitter 127, and an antenna 128. The processor 125 is configured to establish, maintain and utilize an NCB channel in accordance with the present invention. The receiver 126 and the transmitter 127 are in communication with the processor 125. The antenna 128 is in communication with both the receiver 126 and the transmitter 127 to facilitate the transmission and reception of wireless data.

Figure 3:
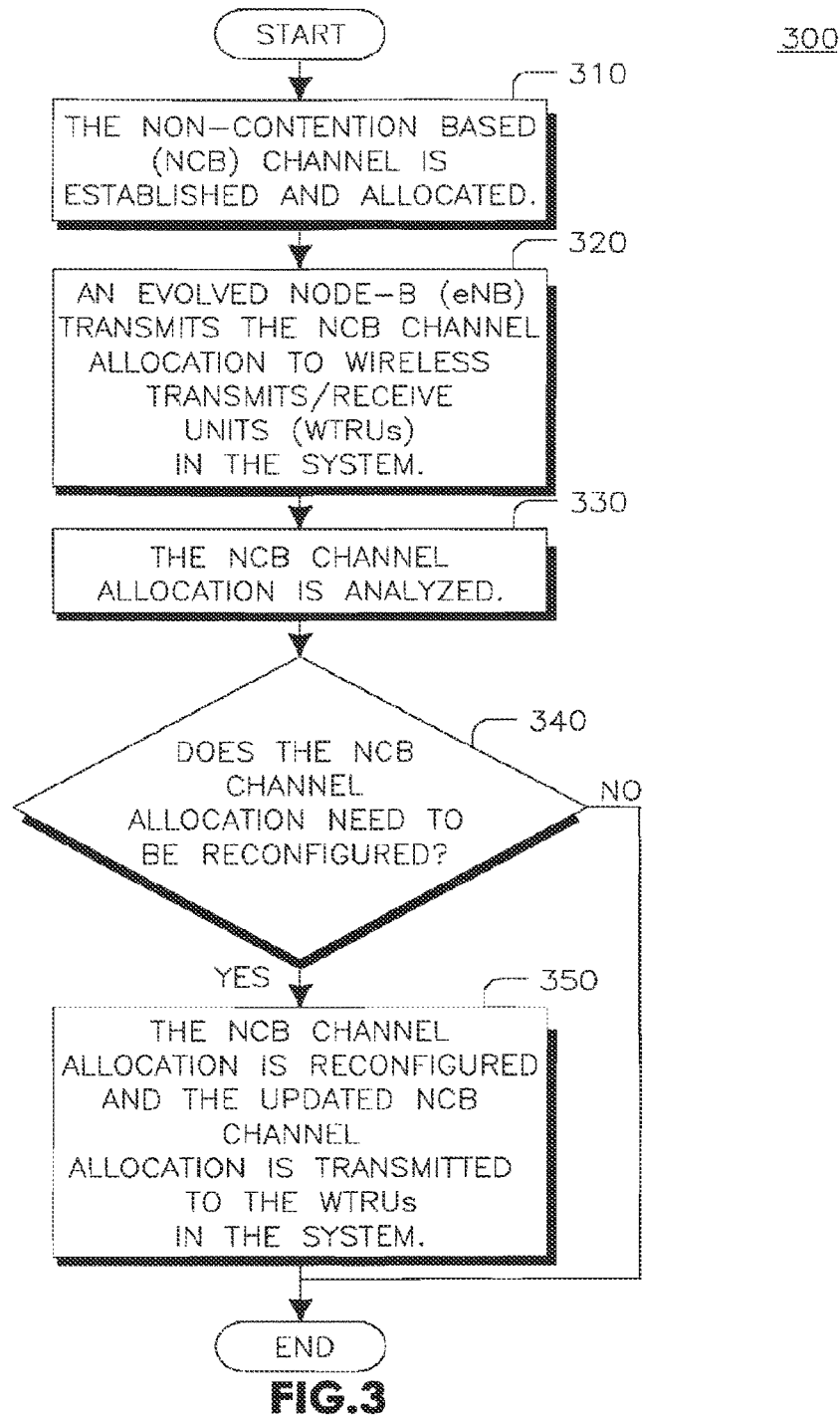
FIG. 3 is a flow diagram of a method for establishing and maintaining a non-contention based (NCB) channel with a particular WTRU, in accordance with the present invention.

FIG. 3 is a flow diagram of a method 300 for establishing and maintaining an NCB channel with a particular WTRU, in accordance with the present invention. In step 310, the NCB channel is established and allocated. The NCB channel may be configured by the eNB 110. For example, a network operator may identify certain radio resource management (RRM) parameters that are used by the eNB 110 to determine the NCB channel configuration and when it is established and reconfigured.

In the establishment of the NCB channel, the duration and periodicity of the channel may be configured. In a preferred embodiment, the duration may be infinite. Additionally, the system or WTRU 120 may have the ability to terminate or reconfigure the allocated NCB channel. In the infinite case, signaling from either the eNB 110 or the WTRU 120 may terminate the NCB channel allocation.

The NCB channel may be allocated to a particular WTRU 120 for a given duration. The duration may be a subset of time for the WTRU 120 to utilize the NCB channel or the WTRU 120 may be assigned a periodic interval for usage of the NCB channel. It should also be noted that any combination of the above allocations may be utilized, and the durations and/or periodic operation may include the physical resources allocated being time multiplexed among a plurality of WTRUs 120.

The wireless communication system 100 may utilize a number of characteristics in configuring the NCB channel. For example, the NCB channel may be configured to support functions such as timing advance, measurement reporting, UL physical resource requesting, providing information for DL resource scheduling, keep-alive heartbeat, hybrid automatic repeat request (HARQ) feedback and/or Medium Access Control (MAC) or Radio Resource Control (RRC) layer signaling, all of which are described herein following. Furthermore, the NCB channel may be configured to support a combination of functions. For example, a particular WTRU 120 performing a scheduling request may also be concurrently providing measurement reporting or concurrently providing a synchronization burst to perform timing advance. Accordingly, any combination of these functions may be performed in a common signaling procedure. Therefore, any number of functions may be performed concurrently on a configured NCB channel. In another embodiment, a periodic NCB channel may be configured following a predefined period during which no UL transmissions have been occurring.

Additionally, the service types such as Voice over IP (VoIP) or internet gaming, the Quality of Service (QoS) requirements for services currently active on the WTRU 120 may be utilized, as well as the activity rate of those services.

The configuration of the NCB channel may also include multiplexing it in the frequency domain, such as through frequency division multiplexing (FDM). The NCB channel may also be multiplexed in the code domain by using spreading codes, in the time domain, and in the space domain using spatial division multiplexing (SDMA) or other MIMO techniques. Furthermore, the NCB channel may be multiplexed by any combination of the above multiplexing techniques.

In this way, physical resources utilized by the NCB channel may be configured for use by more than one WTRU 120 at various times without being contended for by those WTRUs 120 during any particular period of time. For example, the NCB channel may be allocated to WTRU$_1$ for a particular periodicity and/or duration, and allocated to WTRU$_2$ for another periodicity and/or duration. Accordingly, the NCB channel is typically dedicated to a particular WTRU 120 at a particular moment in time, but shared among a plurality of WTRUs 120 over various periods in time.

Still referring to FIG. 3, the NCB channel allocation is transmitted to the WTRUs 120 in the wireless communication system 100 by the eNB 110 (step 320) with which the WTRUs 120 are in communication. In the example depicted in FIG. 1, eNB$_1$ transmits the NCB channel allocation to WTRU$_1$, WTRU$_2$, and WTRU$_3$, while eNB$_2$ transmits the NCB channel allocation to WTRU$_4$. This transmission, or communication, may be included in the downlink (DL) common control channel signaling or a dedicated control channel signal mapped to a DL shared channel among the WTRUs 120.

Alternatively, the NCB channel may be allocated by the DL common control channel as other uplink (UL) shared channel allocations. Additionally, where the NCB channel is a control channel separate from the UL shared channel used for user data transmissions, a logical control channel mapped to the DL shared channel may be utilized.

Figure 4:
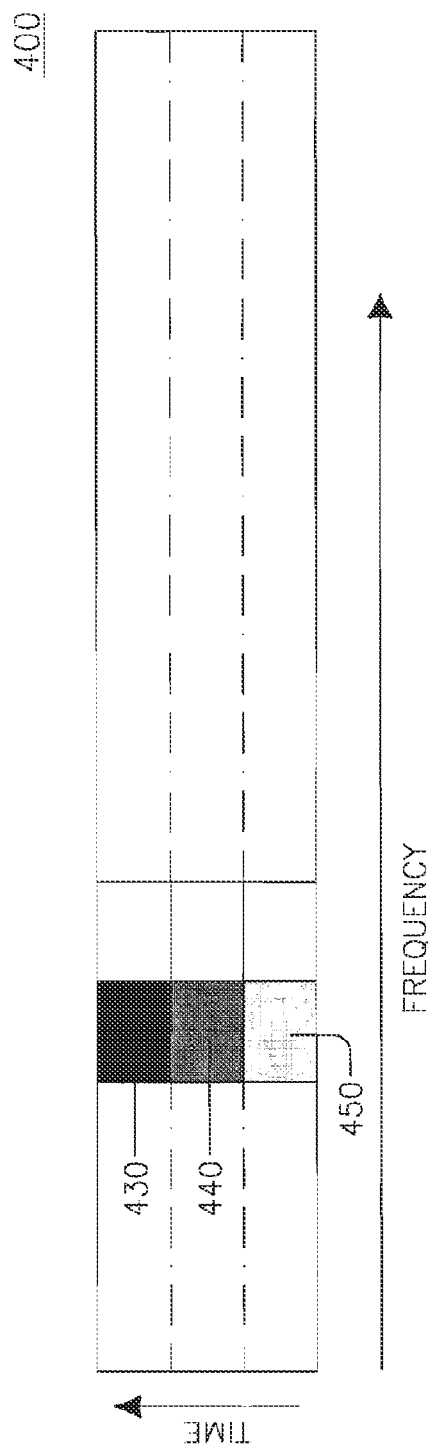
FIG. 4 is an exemplary time-frequency diagram depicting an NCB channel allocation to a plurality of WTRUs, in accordance with the present invention.

FIG. 4 is an exemplary time-frequency diagram 400 depicting an allocation of NCB channels (designated 430, 440, and 450) to a plurality of WTRUs 120, in accordance with an embodiment of the present invention. In particular, NCB channel 430 may be dedicated to WTRU$_1$, NCB channel 440 may be dedicated to WTRU$_2$, and NCB channel 450 may be dedicated to WTRU$_3$. Accordingly, in the present example, WTRU$_1$ accesses eNB$_1$ on NCB channel 430, WTRU$_2$ accesses eNB$_1$ on NCB channel 440, and WTRU$_3$ accesses eNB$_1$ on NCB channel 450, whereby the WTRUs 120 do not need to contend with one another for access to the eNB 110.

As shown in FIG. 3, the allocation of the NCB channel is analyzed by the wireless communication system 100 (step 330) to ensure an optimal allocation. For example, the wireless communication system 100 may analyze the amount of time the currently allocated NCB channel has remained idle, or the QoS requirements for the various WTRUs 120 in the system 100. Alternatively, the system 100 may determine that the NCB channel should be reconfigured upon reception of channel allocation signaling whereby data capacity may need to be increased or decreased. If the system 100 determines that a reconfiguration or reallocation is required based on the analysis (step 340), then the system 100 may reconfigure the allocation of the NCB channel, and transmit the updated NCB channel allocation to the WTRUs 120 in the system (step 350).

Figure 5:
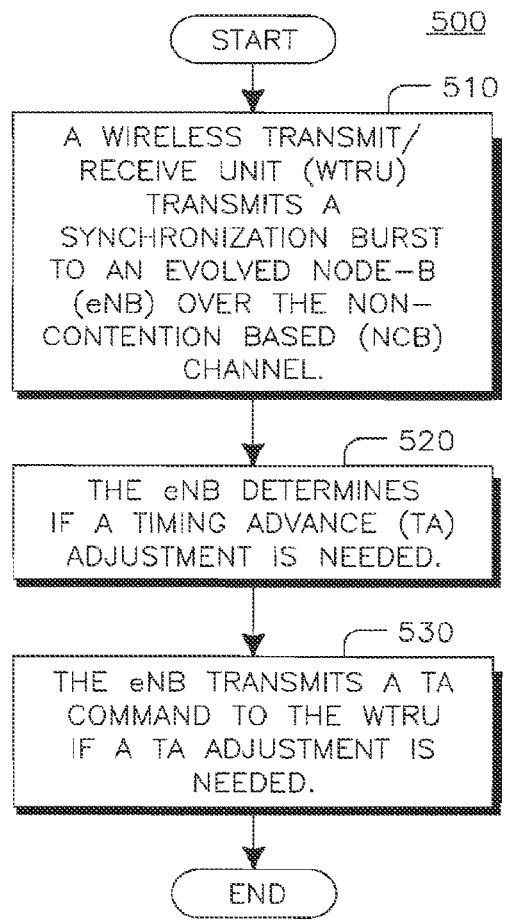
FIG. 5 is a flow diagram of a method for determining a timing advance using an NCB channel, in accordance with the present invention.

FIG. 5 is a flow diagram of a method 500 for determining a timing advance using an NCB channel, in accordance with the present invention. In step 510, the WTRU 120 transmits a synchronization burst to the eNB 110 over the NCB channel allocated to the WTRU 120. This synchronization burst may be transmitted periodically or dynamically based on specific triggering events. Since timing advance is relative to signal propagation delay and a maximum WTRU speed is known, a periodicity requirement of timing advance bursts can be calculated and matched with the configured periodicity of the NCB channel. Preferably, the synchronization bursts are coordinated with the time intervals that the NCB channel exists for that particular WTRU 120.

The eNB 110 receives the synchronization burst from the WTRU 120 and performs timing estimation to determine whether or not a timing advance (TA) adjustment is needed to maintain physical synchronization between the WTRU 120 and the eNB 110 (step 520). If a TA adjustment is needed (step 520), then the eNB transmits a TA command to the particular WTRU 120 (step 530). This TA command may be sent on the DL common control channel or on a control channel mapped to a DL shared channel assigned to the particular WTRU 120.

Since a periodic NCB channel may be configured following a predefined period during which no UL transmissions have been occurring, the NCB channel can be dynamically allocated, or established, during periods of UL inactivity to maintain synchronization. By maintaining synchronization during periods of inactivity with the NCB channel, transmission may be restarted with reduced latency which allows QoS requirements to be better maintained.

Figure 6:
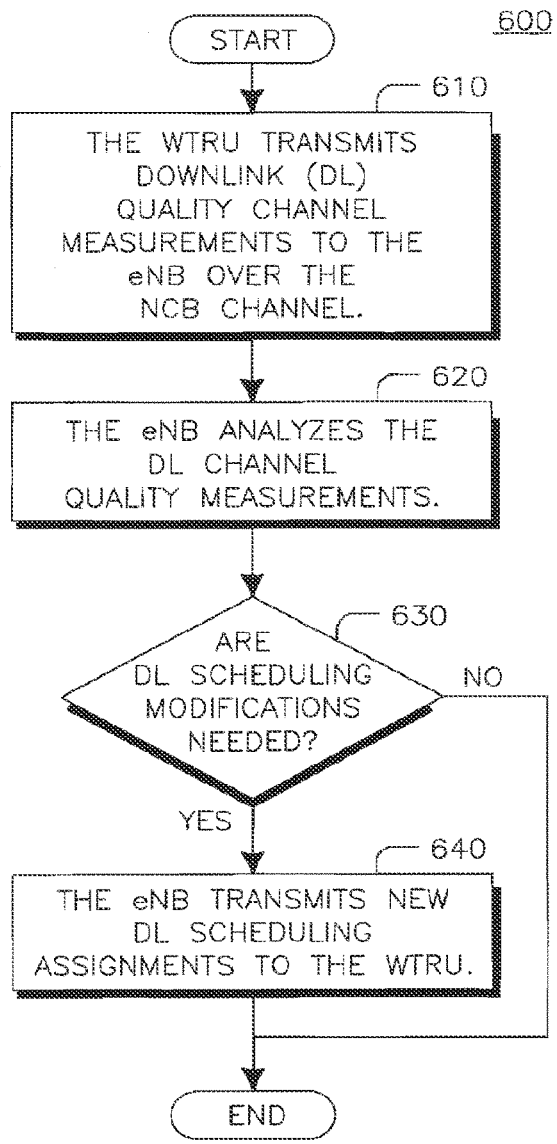
FIG. 6 is a flow diagram of a method for determining scheduling modifications using an NCB channel, in accordance with another embodiment of the present invention.

FIG. 6 is a flow diagram of a method 600 for determining DL scheduling modifications using an NCB channel, in accordance with another embodiment of the present invention. The WTRU 120 transmits a burst to the eNB 110 over the NCB channel reporting the DL channel quality measurements (step 610). When the eNB 110 receives the channel quality measurements, the eNB 110 analyzes them to determine whether or not modifications, or adjustments, to DL scheduling need to be made (step 620). DL channel quality measurements may be reported periodically or dynamically based on triggering events. Preferably, channel quality reporting coincides with the configured allocation of the NCB channel. Use of the NCB channel for WTRU measurement reporting provides a more efficient use of physical resources and provides UL information signaling with reduced latency compared to use of a RACH, or dynamically requesting a UL shared channel for this purpose. If a DL scheduling modification is needed (step 630), then the eNB 110 transmits the new DL channel scheduling assignments to the WTRU 120 (step 640).

In the embodiment shown in FIG. 6, the NCB channel may be periodically configured or event triggered for UL measurement reporting. Accordingly, as described above, this use of the NCB channel may coincide with other concurrent functions or uses of the NCB channel, such as timing advance, scheduling requests, measurement reporting and the like.

Figure 7:
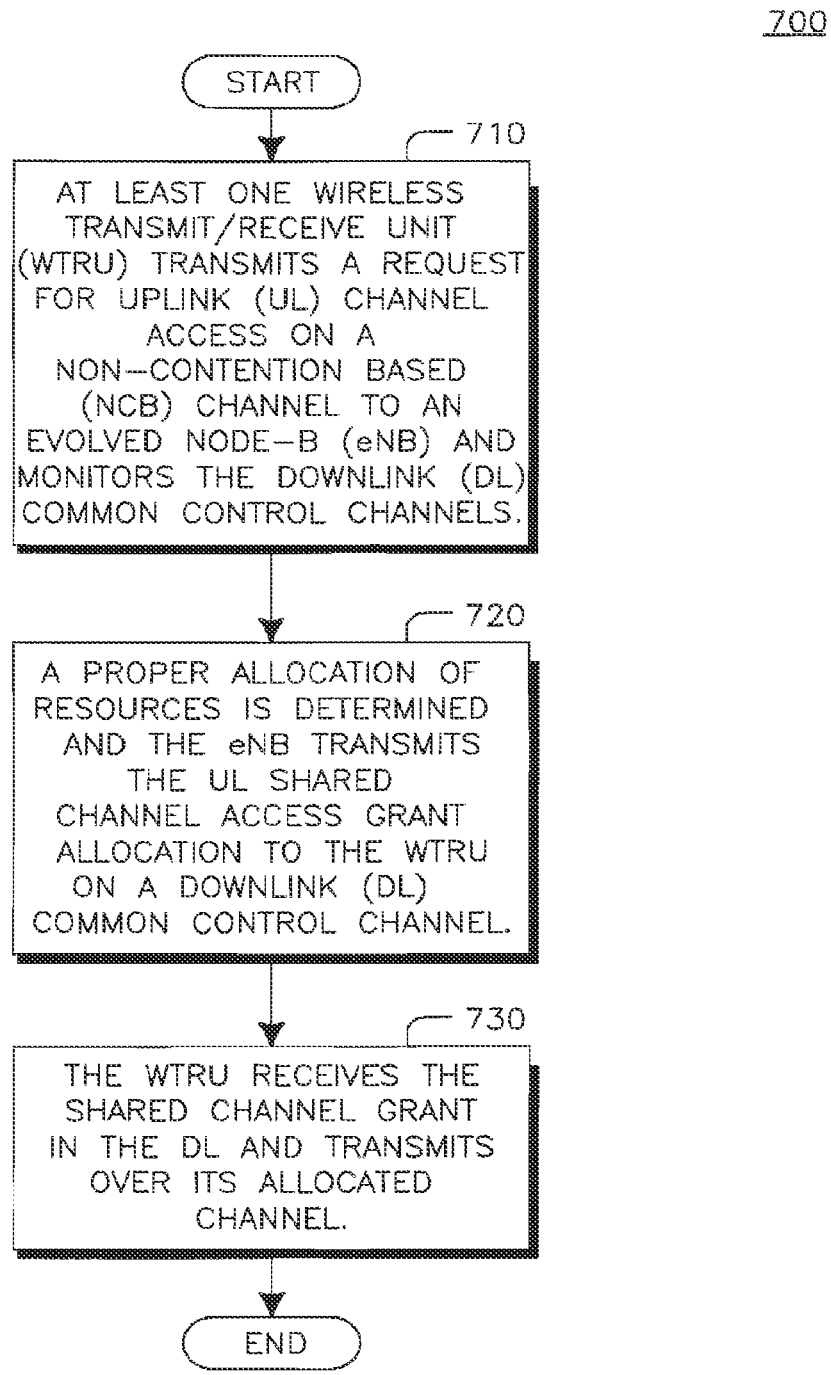
FIG. 7 is a flow diagram of a method of allocating resources using an NCB channel, in accordance with another embodiment of the present invention.

FIG. 7 is a flow diagram of a method 700 of requesting UL resources using an NCB channel, in accordance with another embodiment of the present invention. In step 710, one or more WTRUs 120 transmit a scheduling request for UL channel access on their dedicated NCB channel that has been configured and allocated for them. In the present embodiment, the NCB channel may be periodically configured or even triggered for support of scheduling requests. Additionally, the occurrence of scheduling requests may coincide with other NCB channel uses, such as timing advance, channel measurement reporting and the like.

Referring back again to FIG. 4, the transmitted request in step 710 of FIG. 7 may be a burst transmitted by one of the WTRUs 120 on its respective NCB channel (430, 440, or 450) requesting an allocation of UL physical resources whereby the presence of the burst itself is indicative of the resource allocation request for that particular WTRU 120. Alternatively, the burst may be an indication which, for example, may only include one bit of information, such as a "zero (0)" or a "one (1)" that indicates whether or not a resource allocation is needed. The burst may also include information related to the resource allocation request, such as the amount of UL data the particular WTRU 120 will need to transmit, the priority of the data, the QoS, latency requirement, BLER requirement and the like.

The NCB may be configured with periodic operation with or without a specified duration. Preferably, the UL channel allocation request will coincide with the periodic operation of the NCB channel. If an urgent UL resource request is required and an NCB is not available, the RACH may be used. The UL resource request method may coincide with the timing advance method 500, or measurement reporting method 600. In these cases the NCB channel provides multiple purposes in a common UL transmission.

Based on the UL resource request, a proper allocation of resources is determined and the eNB 110 transmits the UL shared access grant to the one or more WTRUs 120 on a DL common control channel (step 720), as shown in FIG. 7.

Figure 8:
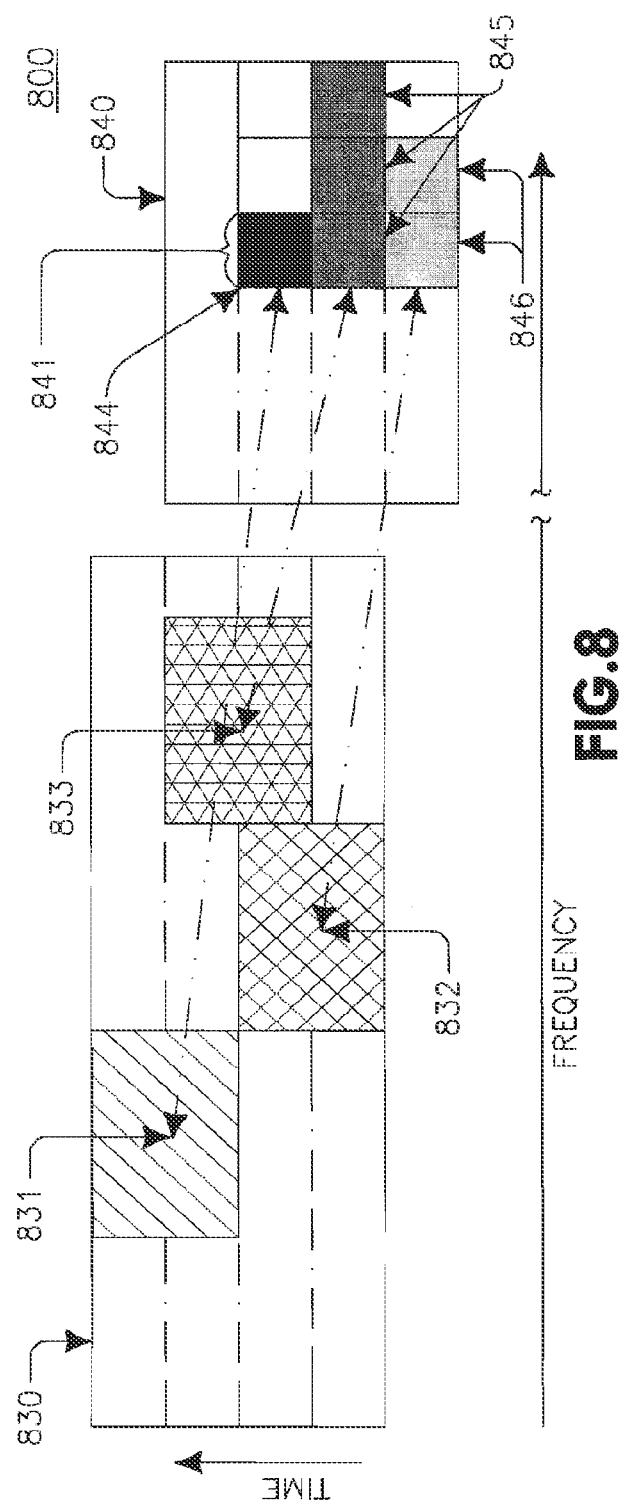
FIG. 8 is an exemplary time-frequency diagram depicting an allocation of resources, in accordance with the method of FIG. 6.

For purposes of example, FIG. 8 is an exemplary time-frequency diagram 800 depicting an allocation of physical resources, in accordance with step 720 of the method 700 of FIG. 7. FIG. 8 is a time-frequency diagram 800 that includes an allocated resources portion 830 and an allocated resource blocks portion 840. In the present example, the allocated resources portion 830 depicts a resource allocation for $WTRU_1$ (831), a resource allocation for $WTRU_2$ (832), and a resource allocation for $WTRU_3$ (833). In this manner, the resource allocation may be determined implicitly by the WTRUs 120 based on the resource utilized for the access grant in the DL transmission.

Alternatively, the resource allocations 831, 832, and 833 may correspond to allocated resource blocks in the allocated resource blocks portion 840. For example, referring again to FIG. 8, resource allocation 831 corresponds to a single resource block 844 allocated for $WTRU_1$. However, resource allocation 832 corresponds to three (3) resource blocks 845 that are allocated for $WTRU_2$, while resource allocation 833 corresponds to two (2) resource blocks 846 that are allocated for $WTRU_3$. It should be noted that the resource block allocation shown in FIG. 8 is exemplary and any particular resource allocation may correspond to a single resource block or to a plurality of resource blocks. An identifier (ID) for the particular WTRU 120 that is allocated a resource block may be included to identify to the WTRU 120 which resource block belongs to it. Alternatively, the DL control channel may be common to a plurality of WTRUs 120.

In any event, the resource allocation is identified to the WTRU 120 as to any period that the resource is allocated for that WTRU 120, as well as where that allocation exists. For example which resource blocks are allocated to a particular WTRU 120 is identified to the WTRU 120.

Once particular WTRUs 120 receive their shared channel access grants in the DL, the WTRUs 120 transmit over their allocated channels or resource blocks (step 730).

In yet another embodiment, the NCB channel may be utilized for keep-alive heartbeat. For example, the WTRU 120 transmits a periodic keep-alive signal over the NCB channel that is utilized by the system to detect a failure of the radio link between the WTRU 120 and the eNB 110. In this manner, the system can institute any action required to restore any lost connectivity with this particular WTRU 120 as well as recover any resources that are allocated to the WTRU 120. Additionally, as with various other NCB channel functions and uses, signaling for the keep-alive heartbeat may be combined with other NCB channel functions whose UL channel requirement coincides. For the purposes of a keep-alive signal a similar NCB channel may be allocated in the DL so that the WTRU may take proper actions required following a link failure.

In another embodiment, the NCB channel may be utilized for HARQ feedback. For example, in response to HARQ transmissions, the NCB channel may be utilized for transmission of positive (successful) or negative (unsuccessful) acknowledgements (ACKs). Additionally, the process number or any other HARQ parameters used to coordinate HARQ transmissions may be transmitted over the NCB channel, depending on the HARQ method. The NCB channel may be particularly useful in the case of synchronous HARQ operation where periodic feedback may be aligned with the periodic configuration of the NCB channel.

In another alternative embodiment, the NCB channel may be utilized for MAC signaling, RRC signaling and/or small amounts of user data. Additionally, coordination of the MAC and/or RRC layer operation may be achieved over the NCB channel. In these cases, procedures with known frequency may be mapped to the NCB channel to optimize the use of physical resources. The WTRUs 120 may also transmit small amounts of data on their allocated NCB channel. In this manner, the NCB channel may be used by WTRUs 120 to transmit small amounts of user data when shared channel or other alternate channel is not available/allocated. Allowing user data on the NCB channel reduces transmission latency and improves QoS.

In order to provide resilience against frequency selective fading, the UL NCB channels may comprise several sub-channels in an XFDMA system, such as an orthogonal frequency-division multiple-access (OFDMA) or single carrier (SC) FDMA system (SC-FDMA). In one subframe of an XFDMA system, there are short blocks (SB) and long blocks (LB). An SB is typically used to transmit the reference signals and an LB is typically used to transmit data packets. The reference signals provide a complete view of the channel layout in one OFDM subframe for a particular WTRU 120, and may also be utilized for channel measurements to determine the severity of the frequency selective fading. Accordingly, it can be used to determine how diverse in frequency the NCB channel allocation will need to be.

Figure 9:
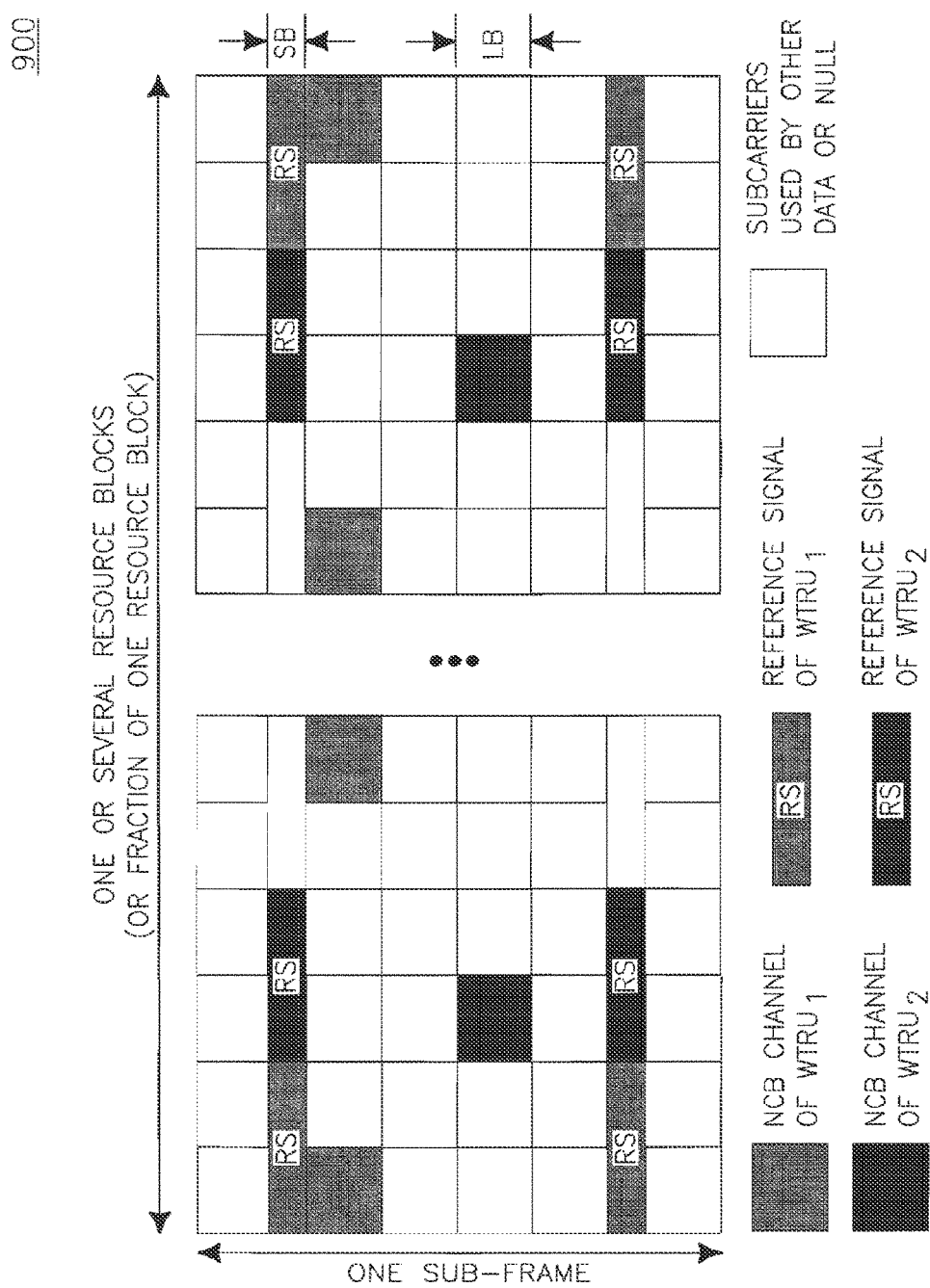
FIG. 9 is an exemplary block diagram depicting a frequency diverse NCB channel allocation in a system comprising a plurality of sub-channels in accordance with the present invention.

FIG. 9 is an exemplary block diagram 900 depicting a frequency diverse NCB channel allocation in a system comprising a plurality of sub-channels, in accordance with the present invention. For example, as depicted in FIG. 9, the NCB channel allocations for $WTRU_1$ and $WTRU_2$ are shown spread over a plurality of sub-channels that may exist in a single resource block or in a fraction of a resource block. Then the NCB channel is allocated in a distributed manner based on the UL channel measurements.

Further efficiency may be achieved in the utilization of the NCB channel where the resource is changed for a particular WTRU 120. For example, the NCB resource allocation may be changed according to a pre-configured time and/or frequency hopping pattern. An NCB channel with a very small amount of channel resources may not have good frequency diversity even if the NCB channel is spread as wide as possible in the frequency domain. Therefore, applying time and/or frequency hopping may further improve the diversity and ensure the NCB channel is received properly at a receiver side.

Figure 10:
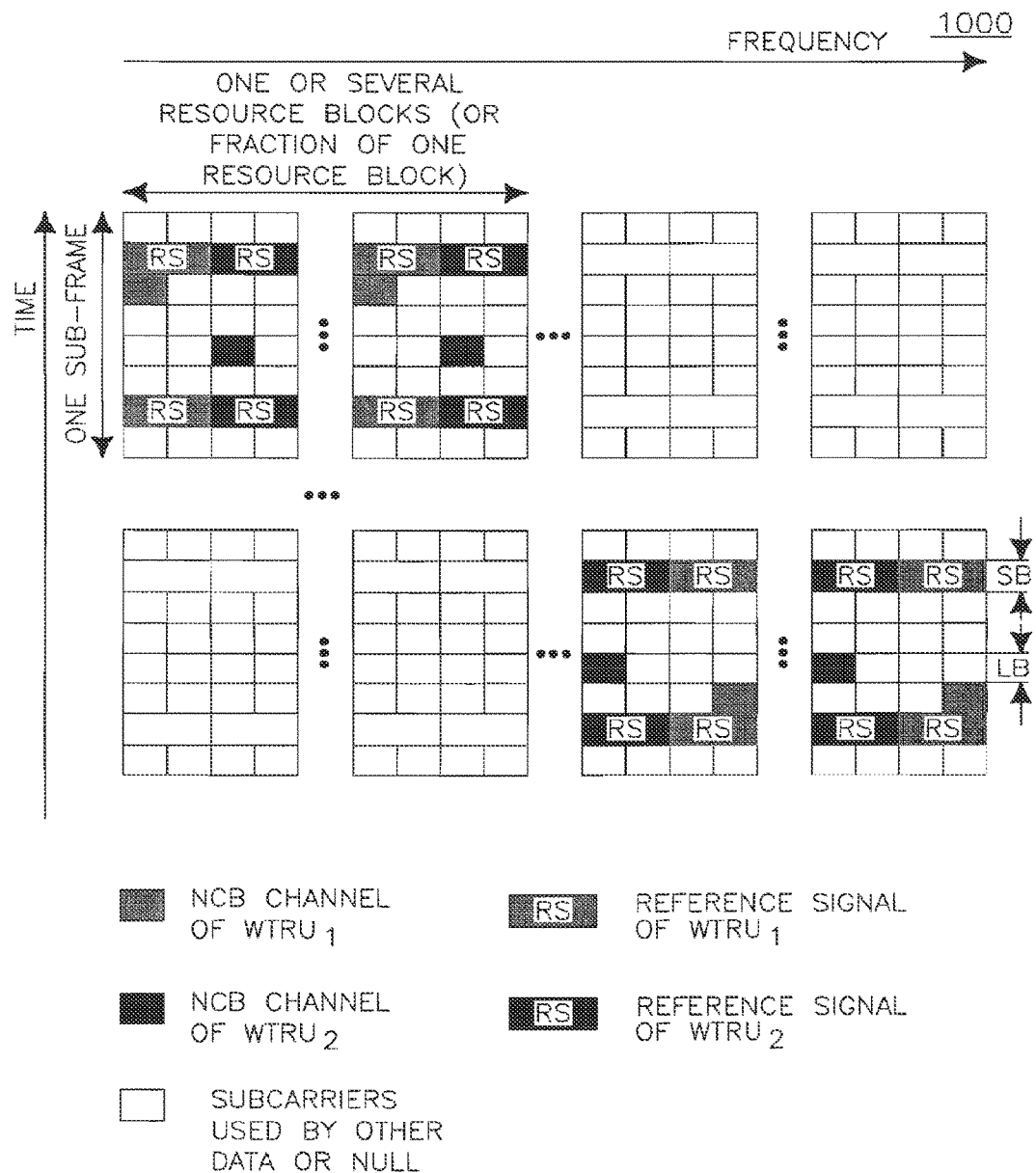
FIG. 10 is an exemplary time-frequency diagram depicting a time and frequency hopping NCB channel allocation, in accordance with an embodiment of the present invention.

FIG. 10 is an exemplary time-frequency diagram 1000 depicting a time and frequency hopping NCB channel allocation, in accordance with an embodiment of the present invention. In different subframes, where the resource is allocated to a particular WTRU 120, the frequency allocation of the resource for an NCB channel will change across subframes. This frequency allocation change is based on the hopping pattern in the time and/or frequency domain, which is pre-configured during the NCB allocation phase. This is another alternative embodiment for physical realization of the NCB channel. The frequency/timing hopping pattern is an important message when signaling NCB channel allocation for a particular WTRU 120 so that it can transmit using the NCB channel according to that hopping pattern. Likewise, the eNB 110 can receive signaling by following the same pattern in a coordinated way.

The NCB channel may be further configured by the eNB 110 transmitting control messages to the WTRU 120. For example, the eNB 110 may transmit a resource message relating to sub-carriers, space (antenna beams), slots, or codes. Additionally, the eNB 110 may transmit a hopping sequence, such as an index of a prescribed set of hopping sequences to the WTRU 120 to which the NCB channel is allocated.

In an additional embodiment, the NCB channel may be allocated along with both real time (RT) and non real time (NRT) services to assist dynamic, semi-dynamic, persistent or semi-persistent scheduling for the services.

For NRT services, the NCB channel may be allocated to support dynamic scheduling. For example, the NCB channel may be used for timing advance, periodic measurement reporting, UL physical resource requesting, UL traffic status reporting, providing information for DL resource scheduling, HARQ feedback and/or MAC/RRC layer signaling, and the like. The NCB channel supporting dynamic or semi-dynamic scheduling may be configured at the beginning of the dynamic or semi-dynamic scheduling of an NRT service for one WTRU, or in the middle of the scheduling. Also the NCB channel can be terminated, modified or extended as situations such as WTRU mobility or channel conditions change.

An NCB channel for some particular applications may have consistent periodicity from the beginning of the scheduling allocation of the NCB. Alternatively, the NCB channel for other particular applications may start its periodicity at a certain time after each bursty transmission.

For example, in the former case, timing advance and measurement reporting may require continuous reporting to support accurate scheduling decisions. However, a HARQ ACK/NAK feedback does not necessarily need to maintain its periodicity from the beginning of the scheduling, and the NCB channel can therefore start a certain time after one bursty transmission for several times unless successful reception is declared.

The duration of the NCB channel may be terminated before its allocated life cycle expires or be extended based on system demand. Termination of an existing NCB may be signaled through an indication from the eNB 110 via an RRC message, MAC signaling (such as a MAC header) or layer 1 or layer 2 (L1/L2) signaling. In one example, the indication can simply be an "OFF (0)" signal.

The termination of the NCB channel allocation can be explicitly or implicitly signaled. For example, at the end of voice silent period, the WTRU 120 sends a voice activity change indication to eNB 110 over the NCB channel. The eNB 110 then allocates new persistent UL radio resources for voice activity over the DL scheduling channel. Upon receiving the UL resource allocation on the DL scheduling channel, the WTRU 120 may implicitly detect the termination of existing NCB channel allocations. Alternatively, one explicit indication can be sent from the eNB 110 to the WTRU 120 to signal the termination.

An extension of the NCB channel may be for a substantially same duration as a previous allocation or for a different duration, either longer or shorter. The extension may also include a configuration of new time and frequency allocation patterns, such as frequency hopping.

The periodicity of the NCB channel may be determined based on the application of the NCB channel. For example, in a WTRU high mobility scenario, a high periodicity NCB channel should be allocated to support UL timing maintenance. How often measurement reports should be sent to the eNB 110 are also determined based on the application of the NCB channel.

Figure 11:
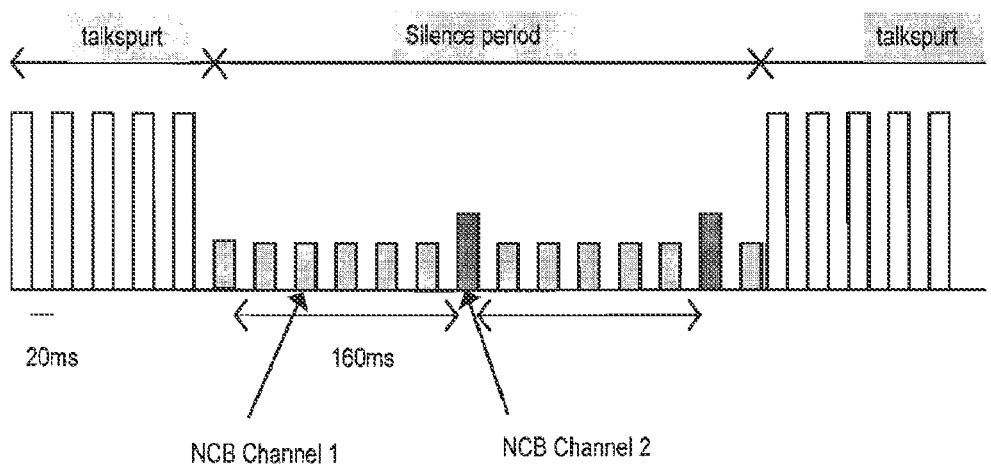
FIG. 11 is an exemplary diagram depicting differing NCB channel requirements for a WTRU, in accordance with an embodiment of the present invention.

FIG. 11 is an exemplary diagram depicting differing NCB channel requirements for a WTRU, in accordance with an embodiment of the present invention. Referring to FIG. 11, more than one NCB channel may be allocated simultaneously to a particular WTRU 120 for different scheduling purposes. These different NCB channels may have different configurations. For example, among other things, NCB channel periodicity and channel capacity may be configured to meet different requirements.

In a voice silent period, there may be NCB channels used to maintain UL timing, to send voice activity reports, to send measurement reports, to send UL scheduling requests and to send voice silence indication detections (SIDs), and the like to eNB 110. However, the periodicity for SID packets in the UL is every 160 milliseconds (ms), which may be different from the periodicity required for other functions. For example, the periodicity for a UL timing advance function may be either shorter or longer than the periodicity for sending SIDs. Also, radio resources used for SID packets and other UL utility purposes are different, which again requires different NCB channel configurations. Accordingly, different NCB channel configurations and allocations for different system requirements may be required. On the other hand, applications with similar resource and periodicity requirements may be grouped into one NCB channel configuration and allocation.

Additionally, there may be different application requirements for one WTRU where an NCB channel with one periodicity is allocated. In this case, the NCB channel may be configured with different radio resource allocations for different intervals within one NCB allocation. For example, a SID packet interval may coincide with other UL functions such as a UL scheduling request, timing maintenance and measurement reporting, and the like, for example every 160 ms. However, if at 160 ms intervals there are more radio resources needed to accommodate extra SID packet needs, the eNB 110 may allocate more radio resources at 160 ms intervals, and less resources at non-160 ms intervals. In doing so, the eNB 110 does not need to always allocate the maximum radio resources for all the NCB channel intervals to accommodate all different scenarios, thereby making resource utilization much more efficient.

Additionally, the NCB channel should be maintained during handovers from one base station to another. To this end, a source base station exchanges signaling with a target base station to allocate the NCB channel for the WTRU 120 in the target cell to which the WTRU is being handed over. This may be accomplished by transmission via a common control channel in the source cell or a shared channel allocated to a particular WTRU 120 to convey target cell NCB channel information to the particular WTRU 120. The information may include NCB channel resources in the target cell, hopping patterns in the target cell, or the timing advance, such as the timing difference between the source and target cells. The timing difference between cells in this case may be computed by the system and transmitted to the WTRU 120 about to be handed over by the source or target base station.

The present invention may be implemented in any type of wireless communication system, as desired. By way of example, the present invention may be implemented in any type of 802 type system, XFDMA, SC-FDMA, OFDMA, E-UTRA, LTE or any other type of wireless communication system.

Additionally, the features of the present invention may be implemented by software, may be incorporated into an integrated circuit (IC) or be configured in a circuit comprising a multitude of interconnecting components. Additionally, the processors 115/125 of the eNB 110 and WTRU 120, respectively, may be configured to perform the steps of any of the methods described above. The processors 115/125 may also utilize the receivers 116/126, transmitters 117/127, and antennas 118/128, respectively, to facilitate wirelessly receiving and transmitting data.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for in use in a wireless transmit receive unit (WTRU), user equipment, terminal, base station, radio network controller, or any host computer. The WTRU may be used in conjunction with modules, implemented in hardware and/or software, such as a camera, a videocamera module, a videophone, a speakerphone, a vibration device, a speaker, a microphone, a television transceiver, a handsfree headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented by a wireless transmit/receive unit (WTRU), the method comprising:
    determining that there is uplink data to be transmitted;
    transmitting a scheduling request over a non-contention based (NCB) uplink control channel based on determining that there is uplink data to be transmitted;
    monitoring a downlink control channel based on transmitting the scheduling request over the NCB uplink control channel;
    detecting that a transmission on the downlink control channel is intended for the WTRU based on a WTRU identifier indicated in the transmission on the downlink control channel, wherein the transmission on the downlink control channel comprises an allocation of an uplink shared channel; and
    transmitting the uplink data over the uplink shared channel in accordance with the allocation of the uplink shared channel received on the downlink control channel.

2. The method of claim 1, wherein the NCB uplink control channel is implemented in a single carrier frequency-division multiple-access (SC-FDMA) wireless communication system.

3. The method of claim 1, further comprising receiving an allocation of the NCB uplink control channel from an evolved Node B (eNB), wherein the allocation of the NCB uplink control channel comprises a configuration for transmitting scheduling requests over the NCB uplink control channel, and the configuration indicates a periodicity assigned to the WTRU for transmitting scheduling requests on the NCB uplink control channel.

4. The method of claim 1, wherein the transmission on the downlink control channel comprises an explicit indication of one or more physical attributes used for transmitting the uplink data over the uplink shared channel.

5. The method of claim 4, wherein the one or more physical attributes explicitly indicated by the transmission on the downlink control channel comprise a resource block assignment for the uplink shared channel.

6. The method of claim 1, wherein the NCB uplink control channel is a combination of time multiplexed, frequency multiplexed, and code multiplexed.

7. The method of claim 1, wherein the WTRU is assigned sub-carrier resources of the NCB uplink control channel for transmission of the scheduling request.

8. The method of claim 1, wherein the scheduling request comprises a burst, wherein presence of the burst on the NCB uplink control channel is indicative of a request for uplink transmission resources by the WTRU.

9. The method of claim 1, wherein the WTRU receives resource information regarding a target cell NCB uplink control channel when handing over from a source cell to a target cell, the resource information regarding the target cell NCB uplink control channel being received via the source cell.

10. A device comprising a processor and memory, the processor and memory configured:
    receive a scheduling request over a non-contention based (NCB) uplink control channel, the scheduling request being received on resources of the NCB uplink control channel that were assigned to a wireless transmit/receive unit (WTRU);
    determine that the WTRU has uplink data to be transmitted based on receiving the scheduling request on resources of the NCB uplink control channel that were assigned to the WTRU;
    send a transmission on a downlink control channel that is intended for the WTRU based on receiving the scheduling request, wherein a WTRU identifier indicated in the transmission on the downlink control channel indicates that the transmission on the downlink control channel is intended for the WTRU, and the transmission on the downlink control channel comprises an allocation of an uplink shared channel; and receive the uplink data over the uplink shared channel in accordance with the allocation of the uplink shared channel sent on the downlink control channel.

11. A wireless transmit/receive unit (WTRU) comprising a processor and memory, the processor and memory configured to:

determine that there is uplink data to be transmitted;

transmit a scheduling request over a non-contention based (NCB) uplink control channel based on determining that there is uplink data to be transmitted;

monitor a downlink control channel based on transmitting the scheduling request over the NCB uplink control channel;

detect that a transmission on the downlink control channel is intended for the WTRU based on a WTRU identifier indicated in the transmission on the downlink control channel, wherein the transmission on the downlink control channel comprises an allocation of an uplink shared channel; and transmit the uplink data over the uplink shared channel in accordance with the allocation of the uplink shared channel received on the downlink control channel.

12. The WTRU of claim 11, wherein the NCB uplink control channel is implemented in a single carrier frequency-division multiple-access (SC-FDMA) wireless communication system.

13. The WTRU of claim 11, further comprising receiving an allocation of the NCB uplink control channel from an evolved Node B (eNB), wherein the allocation of the NCB uplink control channel comprises a configuration for transmitting scheduling requests over the NCB uplink control channel, and the configuration indicates a periodicity assigned to the WTRU for transmitting scheduling requests on the NCB uplink control channel.

14. The WTRU of claim 11, wherein the transmission on the downlink control channel comprises an explicit indication of one or more physical attributes used for transmitting the uplink data over the uplink shared channel.

15. The WTRU of claim 14, wherein the one or more physical attributes explicitly indicated by the transmission on the downlink control channel comprise a resource block assignment for the uplink shared channel.

16. The WTRU of claim 11, wherein the NCB uplink control channel is a combination of time multiplexed, frequency multiplexed, and code multiplexed.

17. The WTRU of claim 11, wherein the WTRU is assigned sub-carrier resources of the NCB uplink control channel for transmission of the scheduling request.

18. The WTRU of claim 11, wherein the scheduling request comprises a burst, wherein presence of the burst on the NCB uplink control channel is indicative of a request for uplink transmission resources by the WTRU.

19. The WTRU of claim 11, wherein the WTRU receives resource information regarding a target cell NCB uplink control channel when handing over from a source cell to a target cell, the resource information regarding the target cell NCB uplink control channel being received via the source cell.

* * * * *